United States Patent
Lee et al.

(10) Patent No.: US 12,328,046 B2
(45) Date of Patent: Jun. 10, 2025

(54) AXIAL FIELD ROTARY ENERGY DEVICE HAVING PCB STATOR AND VARIABLE FREQUENCY DRIVE

(71) Applicant: INFINITUM ELECTRIC, INC., Round Rock, TX (US)

(72) Inventors: Randal A. Lee, Austin, TX (US); Paulo Guedes-Pinto, Round Rock, TX (US); Ben Schuler, Austin, TX (US); Rich Lee, Liberty Lake, WA (US)

(73) Assignee: INFINITUM ELECTRIC INC., Round Rock, TX (US)

( * ) Notice: Subject to any disclaimer, the term of this patent is extended or adjusted under 35 U.S.C. 154(b) by 402 days.

(21) Appl. No.: 17/972,747

(22) Filed: Oct. 25, 2022

(65) Prior Publication Data
US 2023/0044158 A1    Feb. 9, 2023

Related U.S. Application Data

(63) Continuation of application No. 17/147,690, filed on Jan. 13, 2021, now Pat. No. 11,509,179, which is a
(Continued)

(51) Int. Cl.
*H02K 1/2795*    (2022.01)
*H02K 3/26*    (2006.01)
(Continued)

(52) U.S. Cl.
CPC .............. *H02K 3/26* (2013.01); *H02K 1/2795* (2022.01); *H02K 11/33* (2016.01); *H02K 21/24* (2013.01);
(Continued)

(58) Field of Classification Search
CPC .... H02K 1/182; H02K 1/2793; H02K 1/2795; H02K 1/2796; H02K 1/2798; H02K 3/26;
(Continued)

(56) References Cited

U.S. PATENT DOCUMENTS 5,887,145 A   3/1999   Harari et al.
7,165,413 B2  1/2007   Symons
(Continued)

FOREIGN PATENT DOCUMENTS

WO    2021146178    7/2021

OTHER PUBLICATIONS

Bullick, Using One VFD to Control Mulitple Motors, Jun. 6, 2018, pp. 1-9, Keg Technology (Year: 2018).*
(Continued)

*Primary Examiner* — Eric Johnson
(74) *Attorney, Agent, or Firm* — Dickinson Wright PLLC

(57) ABSTRACT

An axial field rotary energy device or system includes an axis, a PCB stator and rotors having respective permanent magnets. The rotors rotate about the axis relative to the PCB stator. A variable frequency drive (VFD) having VFD components are coupled to the axial field rotary energy device. An enclosure contains the axial field rotary energy device and the VFD, such that the axial field rotary device and the VFD are integrated together within the enclosure. In addition, a cooling system is integrated with the enclosure to cool the axial field rotary energy device and the VFD.

8 Claims, 13 Drawing Sheets

Related U.S. Application Data continuation-in-part of application No. 16/999,837, filed on Aug. 21, 2020, now abandoned.

(60) Provisional application No. 62/960,974, filed on Jan. 14, 2020.

(51) Int. Cl.
  *H02K 11/33*  (2016.01)
  *H02K 16/02*  (2006.01)
  *H02K 21/24*  (2006.01)
  *H02P 27/06*  (2006.01)

(52) U.S. Cl.
  CPC .............. *H02P 27/06* (2013.01); *H02K 16/02* (2013.01); *H02K 2203/03* (2013.01); *H02K 2211/03* (2013.01); *H02K 2213/12* (2013.01)

(58) Field of Classification Search
  CPC ........ H02K 11/25; H02K 11/30; H02K 11/33; H02K 16/02; H02K 21/24; H02K 2203/03; H02K 2211/03; H02K 2213/12; H02P 25/022; H02P 25/024; H02P 25/026; H02P 27/04; H02P 27/045; H02P 27/047; H02P 27/048; H02P 27/06; H02P 27/08; H02P 27/085; H02P 27/10; H02P 27/12; H02P 27/14; H02P 27/16; H02P 27/18
  See application file for complete search history.

(56) References Cited

U.S. PATENT DOCUMENTS

| | | | |
|---|---|---|---|
| 8,382,450 B2 | 2/2013 | Ida et al. | |
| 9,019,731 B2 | 4/2015 | Tong et al. | |
| 9,240,733 B2 | 1/2016 | Royak et al. | |
| 9,793,049 B2 | 10/2017 | Goodson | |
| 10,141,803 B2 | 11/2018 | Schuler et al. | |
| 2014/0197768 A1 | 7/2014 | Haugen et al. | |
| 2016/0069352 A1 | 3/2016 | Kreidler et al. | |
| 2017/0155347 A1 | 6/2017 | Park et al. | |
| 2017/0159656 A1 | 6/2017 | Tientcheu-Yamdeu et al. | |
| 2017/0264220 A1 | 9/2017 | Rattan et al. | |
| 2018/0080573 A1 | 3/2018 | Bourqui | |
| 2018/0198340 A1 | 7/2018 | Schuler et al. | |
| 2018/0323689 A1 | 11/2018 | Schuler et al. | |
| 2019/0260325 A1* | 8/2019 | Tian | H02P 29/50 |
| 2019/0267918 A1* | 8/2019 | Lemieux | H02P 6/04 |
| 2019/0273429 A1* | 9/2019 | Li | H02P 29/50 |

OTHER PUBLICATIONS

Missing Portion of Bullick, Jun. 2018 (Year: 2018).*

Notification Concerning Transmittal of International Preliminary Report of Patentability (Chapter 1 of the Patent Cooperation Treaty) dated Jul. 28, 2022 (Jul. 28, 2022) Issued on related international patent application PCT/US2021/013187 by The Intentional Bureau of WIPO.

Italian Office Action dated Jan. 4, 2023 (Jan. 4, 2023) issued on related Italian Patent Application 112022000101662 by the Ministry of Enterprises Made in Italy—General Directorate for the Protection of Industrial Property (Ministero Delle Imprese e del Made in Italy—Direzion Generale per la Tutela Dell Proprieta Industriale).

Canadian Office Action dated Aug. 9, 2023 (Aug. 9, 2023), 4 pages, issued on related Canadian patent application 3163073 by the Canadian Intellectual Property Office.

* cited by examiner

AXIAL FIELD ROTARY ENERGY DEVICE HAVING PCB STATOR AND VARIABLE FREQUENCY DRIVE

CROSS-REFERENCE TO RELATED APPLICATION

This application is a continuation of and claims priority to and the benefit of U.S. patent application Ser. No. 17/147,690, filed Jan. 13, 2021, which is a continuation-in-part of and claims priority to and the benefit of U.S. patent application Ser. No. 16/999,837, filed Aug. 21, 2020, and U.S. Prov. App. No. 62/960,974, filed Jan. 14, 2020, each of which is incorporated herein by reference in its entirety.

TECHNICAL FIELD

This disclosure relates in general to electric motors and, in particular, to a system, method and apparatus for an electric commutated motor (ECM) comprising an axial field rotary energy device with a printed circuit board (PCB) stator and a variable frequency drive (VFD).

BACKGROUND

Most permanent magnet (PM) motors are not designed to operate with a direct connection to an alternating current (AC) electrical source at 60 Hz or 50 Hz. Some PM motors can use a VFD to operate in this way. Typically, PM motors are connected to a separate VFD. In some cases, the motor and VFD are integrated in a common enclosure forming what is commonly referred as an ECM, or as a brushless direct current (BLDC) motor. Conventional ECM and BLDC motors are built in a traditional radial flux configuration with laminated electrical steel stators and pre-formed or randomly wound copper coils.

Axial flux PM electric motors that use printed circuit board (PCB) stator structures, such as those described in U.S. Pat. Nos. 10,141,803, 10,135,310, 10,340,760, 10,141,804 and 10,186,922 (which are incorporated herein by reference in their entirety), also can use a VFD to operate. Due to their substantially different aspect ratio (substantially short length as compared to diameter) compared to conventional radial flux PM motors, axial flux PM motors can be integrated with VFDs in ways not possible with conventional radial flux PM motors. Accordingly, improvements in axial flux ECM design continue to be of interest.

SUMMARY

Embodiments of an axial field rotary energy device or system are disclosed. For example, the system can include an axis, a PCB stator and rotors having respective permanent magnets (PM). The rotors can rotate about the axis relative to the PCB stator. Versions can include a variable frequency drive (VFD) comprising VFD components coupled to the axial field rotary energy device. An enclosure can contain the axial field rotary energy device and the VFD, such that the axial field rotary device and the VFD are integrated together within the enclosure. In addition, a cooling system can be integrated within the enclosure and configured to cool the axial field rotary energy device and the VFD.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments that are illustrated in the appended drawings. However, the drawings illustrate only some embodiments and are not to be considered limiting in scope since there can be other equally effective embodiments.

It shall be noted that some of the details and/or features shown in the drawings herein may not be drawn to scale for clarity purposes.

The use of the same reference symbols in different drawings indicates similar or identical items.

DETAILED DESCRIPTION

This disclosure includes embodiments of systems comprising an axial field rotary energy device having a permanent magnet (PM), at least one printed circuit board (PCB) stator, a variable frequency drive (VFD), input and output (I/O) interfaces, and other components physically assembled, for example, in a common enclosure. Hereinafter, these systems can be referred to as a VFD integrated system, a motor-VFD assembly, etc. However, it should be understood that the axial field rotary energy device in these systems can operate as a motor or as a generator.

Figure 1:
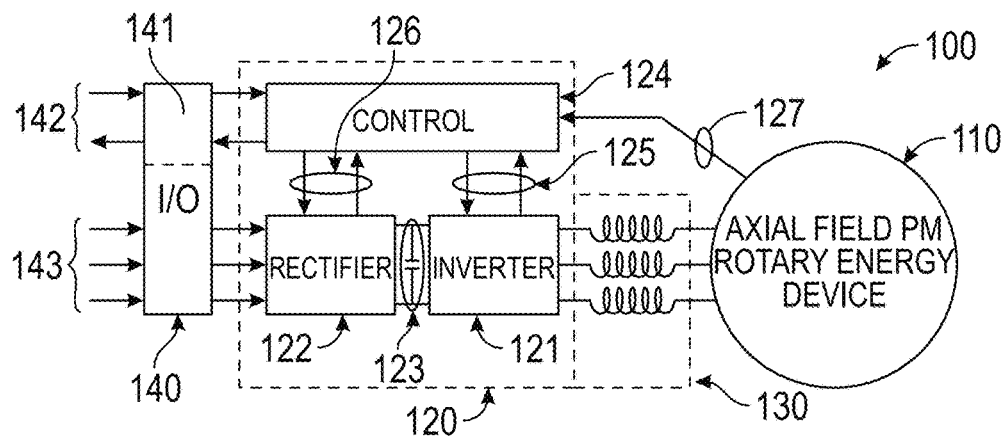
FIG. 1 is a schematic diagram of an embodiment of a system comprising an axial field rotary energy device and a VFD.

FIG. 1 shows a general schematic view of an embodiment of the VFD integrated system 100. In this diagram, a PM axial field rotary energy device 110 can be coupled to the inverter module 121 of a VFD 120 through line inductors 130. In some embodiments, the line inductors 130 can reduce ripple in the electric current supplied to the device 110. In other versions, the line inductors 130 can be absent, such that the axial field rotary energy device 110 can be connected directly to the inverter module 121 of the VFD 120. Although the example shown in FIG. 1 depicts a 3-phase motor connected to a 3-phase inverter, other phase arrangements are possible, such as 1, 2, 4, 5 or 6-phase devices, just to mention few options.

In FIG. 1, the VFD 120 can comprise a rectifier module 122, a DC bus module 123, an inverter module 121, and a control module 124. The rectifier module 122 can be, as an example, a full wave rectifier having passive devices, such as diodes, or active switching devices (e.g., IGBTs, MOSFETs, etc.) to convert the incoming alternating current (AC) to direct current (DC). The DC bus 123 can include a bank of capacitors sized to provide stable voltage to the inverter module 121. The inverter module can have, as an example, a 6-pulse 3-phase bridge, which can use active switching devices, such as IGBTs or MOSFETs, controlled by a pulse width modulation (PWM) scheme to convert DC to AC at the frequency required by the axial field rotary energy device 110. However, other inverter topologies can be used, such as 3-phase neutral point clamped (NPC) inverter. Although the input to the VFD 120 is typically AC at 60 or 50 Hz, the output frequency of the VFD 120 can range from, for example, a frequency near zero Hz, to a frequency in the hundreds or even thousands of Hz. In some embodiments, the power supplied to the VFD integrated system 100 can be DC, in which case, the rectifier module 122 can be absent. As an example, in embodiments where the PWM frequencies are high (e.g., above 100 kHz), the inverter module 121 can comprise wide band gap (WBG) devices such as silicon carbide or gallium nitride MOSFETs.

The VFD integrated system 100 depicted in FIG. 1 can include a control module 124 that provides and receives signals to and from the various modules of the VFD 120. These signals can be received from an external source, such as a digital signal, to turn the VFD on or off, or an analog voltage signal that can provide a speed reference to the system. These signals can control the output frequency of the VFD 120, and therefore the speed of the axial field rotary energy device 110. They also can control the current and voltage supplied by the VFD 120 to the axial field rotary energy device 110 to achieve desired torque characteristics, such as operating at a constant torque condition over a certain speed range. FIG. 1 depicts input and output connection pairs 125 and 126 between the control module 124 and the inverter 121 and rectifier 122, respectively. However, there can be more than one single input or output or, in some embodiments, input or output connections can be absent.

In some embodiments, the control module 124 also can be connected to the sensors in the axial field rotary energy device 110 via a separate set of input lines 127. The sensors can include, for example, resistance temperature detectors (RTD), thermocouples, vibration sensors, encoders, and/or other sensors for the VFD integrated system 100. In some embodiments, the sensors may transmit one or more measurements to the control module 124. The control module 124 may perform an operation in response to receiving and processing the one or more measurements. For example, a temperature sensor may transmit a measurement pertaining to temperature of the axial field rotary energy device 110 as it operates. If the temperature measurement is above a threshold temperature level, then the control module 124 may provide a signal to cause the axial field rotary energy device 110 to reduce its power, thereby reducing its temperature. In certain instances, based on a measurement from the sensors, the control module 124 may cause the axial field rotary energy device 110 to stop operating.

The control module 124 may include a memory device, a processing device, a communication interface device, or some combination thereof. For example, the memory device may store instructions that, when executed by the processing device, can cause the processing device to perform an operation, function, or the like. For example, the instructions may implement a control scheme for outputting signals to control the output frequency of the VFD 120.

The processing device may include one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a system on a chip, a field programmable gate array (FPGA), a digital signal processor (DSP), network processor, or the like. The processing device is configured to execute instructions for performing any of the operations and steps discussed herein.

The memory device may include a main memory (e.g., read-only memory (ROM), flash memory, solid state drives (SSDs), dynamic random access memory (DRAM) such as synchronous DRAM (SDRAM)), a static memory (e.g., flash memory, solid state drives (SSDs), static random access memory (SRAM)), etc.

The communication interface device may enable communicating data between the VFD modules transmitting and receiving analog and digital signals that command VFD voltage frequency outputs and communicate status of the VFD and axial field rotary energy device.

Some versions of the control module 124 may be connected to external systems through an input/output (I/O) module 140 that provide the connections between the VFD integrated system 100 and a supervisory control and data acquisition system (SCADA) or other control system. The I/O module 140 can have a configurable control interface 141 that can facilitate communication to an external control system by means of a set of input/output connections 142. Embodiments of the communication interface can include, but are not limited to, Ethernet and Industrial Ethernet (EtherCAT, EtherNet/IP, PROFINET, POWERLINK, SERCOS III, CC-Link IE, and Modbus TCP), RS485, wireless including WIFI, cellular, and Bluetooth.

The configurable control interface 141 also may have other digital and analog interfaces to connect the VFD integrated system 100 to the end user control system, such as a 0-10 V or a 4-20 mA analog ports. The control portion of the I/O module 141 may have additional connections implemented on, for example, a 'daughter board' mounted on top of a standard I/O board.

Embodiments of the I/O module 140 also can provide power connections 143 to connect the VFD integrated system 100 to an external power supply. As described herein, FIG. 1 depicts an embodiment of a VFD integrated system 100 connected to a 3-phase AC source. However, this system also can be connected to a single-phase source, to a multiphase source, or to a DC source. The I/O module 140 may have current and voltage sensors and other elements for the VFD integrated system, such as harmonic filters.

Some embodiments of the VFD integrated system 100 can have the power connection 143 directly connected to the rectifier module 122 of the VFD 120, thereby completely bypassing the I/O module 140.

Whereas FIG. 1 depicts a VFD integrated system 100 (e.g., with a motor), alternatively the system can be used as a generator-VFD system where the axial flux PCB stator PM machine 110 operates as a generator, and the VFD 120 provides the integration to the external grid. In this case, the rectifier module 122 of the VFD can have active switching devices such as IGBTs or MOSFETs, and the control module 124 can provide the signal to control the active rectifier by means of the communication ports 126, in some versions.

Figure 2A:
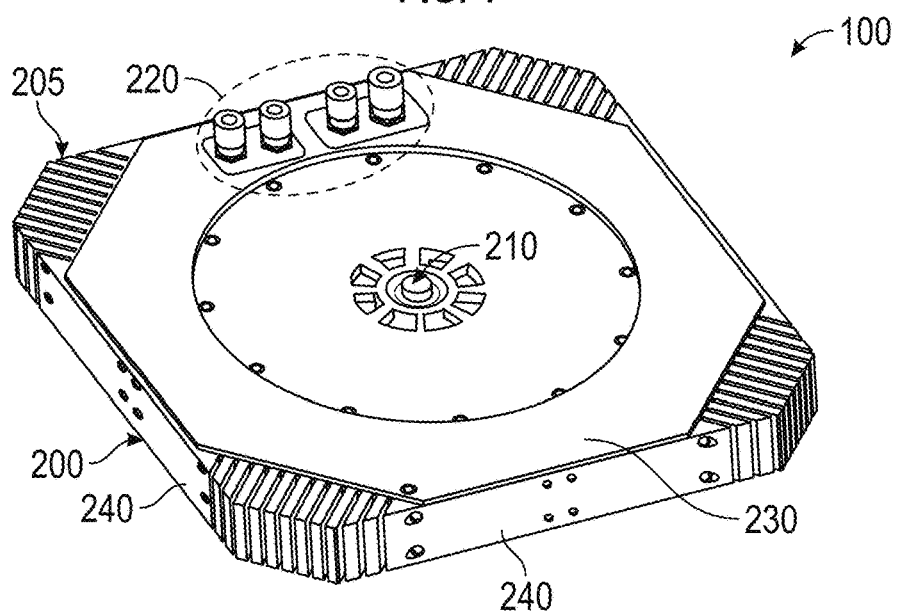
FIGS. 2A-2B are isometric views of embodiments of a VFD integrated system from the non-drive end and drive end, respectively, of its enclosure.
Figure 2B:
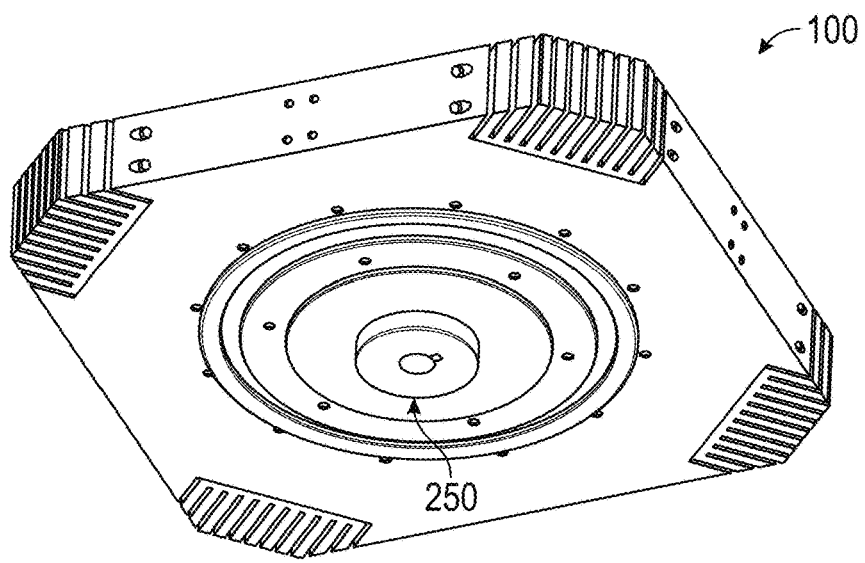

FIGS. 2A and 2B depict an embodiment of a system that can comprise the VFD integrated system 100 described in FIG. 1, and further include an enclosure 200. The enclosure 200 can contain the VFD integrated system 100 and can be relatively thin in the axial direction (e.g., along shaft 210). The enclosure 200 also can be substantially rectangular or square in shape when viewed axially. The enclosure 200 can be radially wider than its axial length. In one example, the enclosure 200 can be approximately 23 inches square (i.e., radially) and 3 inches long (i.e., axially). However, other sizes and aspect ratios are possible depending on the power and torque ratings of the device. For example, a ratio of the radial width to the axial length can be in a range of about 2:1 to about 10:1, or even about 15:1 or 20:1.

FIG. 2A shows the front side 230 of the enclosure 200, which can be the non-drive end of the axial field rotary energy device. In this image, the front bearing cover is removed to show the shaft 210. In some embodiments, the shaft 210 can have an extension that allows for mounting a second coupling or accessories, such as a cooling fan, a speed sensor, an encoder, etc. FIG. 2A also shows an example of a location for the I/O pass-throughs 220 that can correspond to the I/O connections 142 and 143 described in FIG. 1. In some embodiments, the I/O pass-throughs 220 can be located on one or more lateral sides 240 of the enclosure 200, or on the opposite side of the axial field rotary energy device, or can be located at more than one external portion of the enclosure 200 (e.g., one port on the front side 230 and other ports on one or more lateral sides 240. Whereas the embodiment shown in FIG. 2A has cooling fin blocks 205 on the four corners of the enclosure 200, other embodiments can have cooling fin blocks 205 on only one corner, two corners, or three corners depending on the cooling requirements for the VFD integrated system 100.

FIG. 2B depicts the back side of the VFD integrated system 100, which can be the drive end of the axial field rotary energy device. In this view, a coupling flange 250 is shown as an example. The axial field rotary energy device coupling can have different dimensions and features depending on the application and the type of driven equipment.

Figure 3:
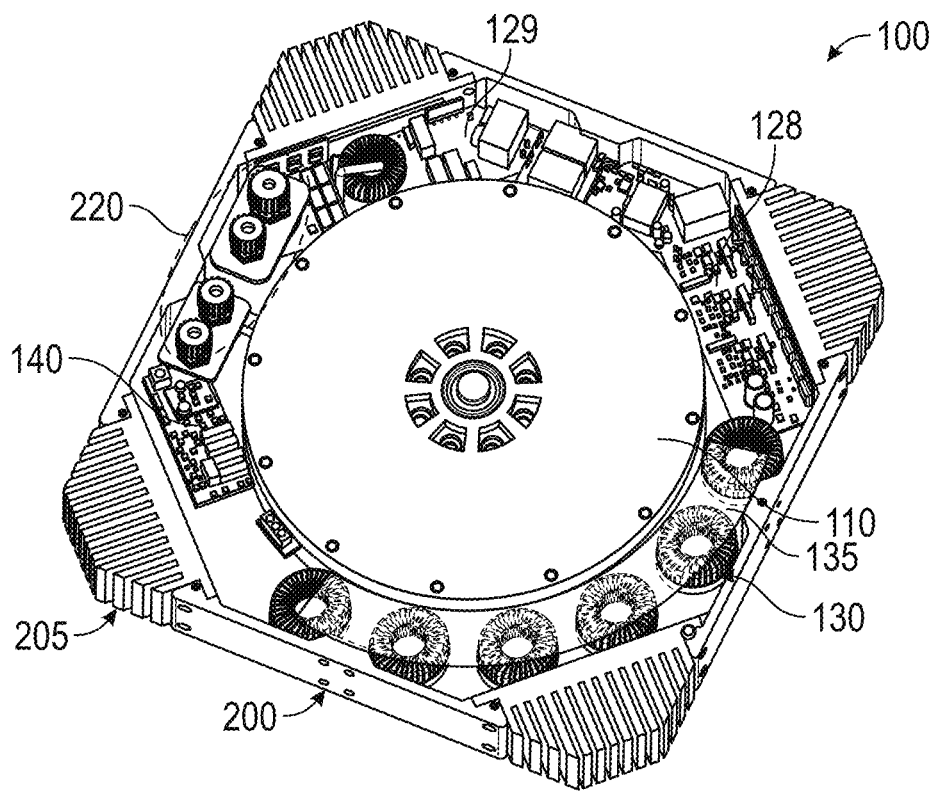
FIG. 3 is an isometric view of an embodiment of a VFD integrated system with a cover removed to show internal components thereof.

FIG. 3 shows an embodiment of the VFD integrated system 100 where the rectifier module, DC bus, inverter module, control module, I/O module, and line inductors form separate assemblies that are mounted around and substantially in the same plane of the axial field rotary energy device 110, all in a common enclosure 200. In this embodiment, the inverter and control modules are arranged in a printed circuit board assembly (PCBA) 128, and the rectifier and DC bus modules are arranged in another PCBA 129, whereas the I/O module 140 resides in its own PCBA. The line inductors 130 can form a separate assembly where they are interconnected by means of a PCB 135. Other modular arrangements are possible, such as having each module of the VFD on a separate PCBA, or all modules combined in one single PCBA, or any other combination thereof.

Figure 4:
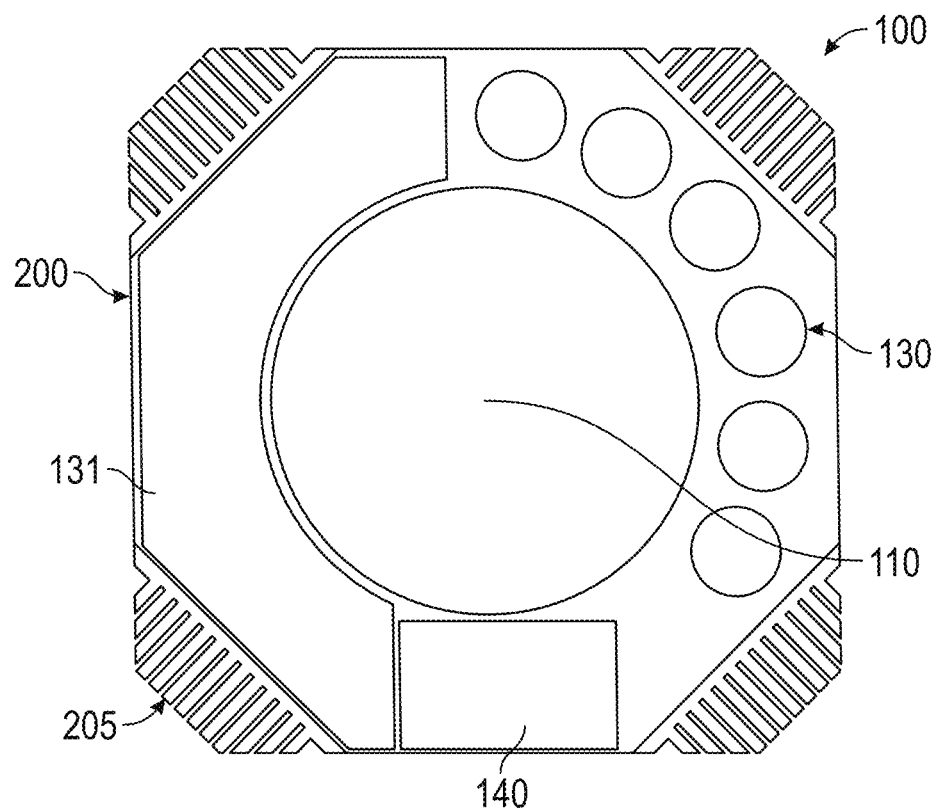
FIG. 4 is a schematic front view of an alternate embodiment of a VFD integrated system showing some of its components.

As an example, FIG. 4 shows an embodiment of the VFD integrated system 100 where the rectifier, DC bus, inverter and control modules of the VFD are all combined in one single PCBA 131. The I/O module 140 can reside on a separate PCBA. The line inductors 130 can form a separate assembly in the enclosure 200, and can be mounted in substantially the same plane as the axial flux PCB stator PM motor 110. Whereas FIGS. 3 and 4 show embodiments with six line inductors 130, it should be understood that other embodiments can have more than six line inductors, others can have less than six line inductors, and others yet can have no line inductors. In the embodiment of FIG. 3, the line inductors 130 are interconnected via a PCB to form an assembly with the PCBA 135. In other embodiments, however, the PCB 135 can be absent and the line inductors 130 can be interconnected with cables and/or wires.

In the embodiment of FIGS. 3 and 4, some of the I/O pass-throughs 220 are approximately aligned with the I/O module 140. Other pass-throughs are approximately aligned with the combined rectifier and DC bus module 129. Other embodiments may have the pass-through blocks placed in other locations.

Whereas FIGS. 3 and 4 show examples of embodiments where the VFD modules are mounted around and substantially in the same plane of the axial field rotary energy device. Other embodiments can have the VFD integrated system integrated in one assembly where the VFD modules are located in a plane substantially different from the plane where the axial field rotary energy device is.

Figure 5:
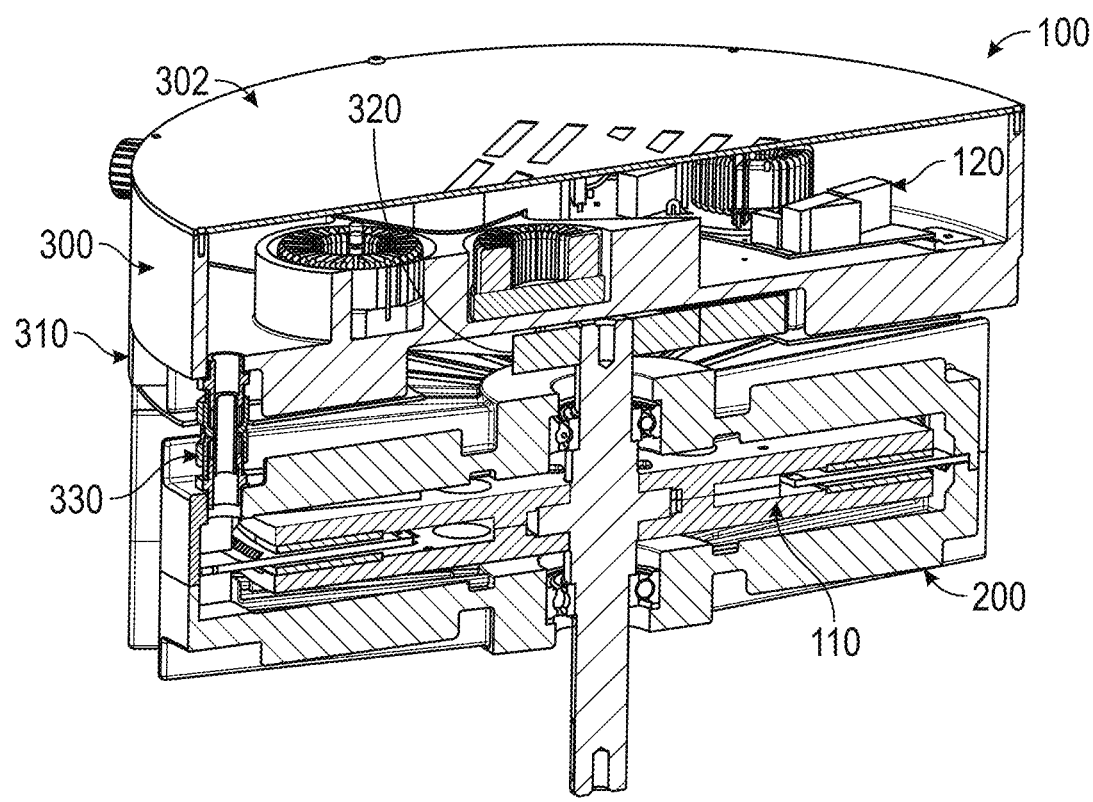
FIG. 5 is a sectional isometric view of an embodiment of a VFD integrated system with a device and VFD in separate enclosures.

FIG. 5 is a sectional view of an embodiment of the VFD integrated system 100. In this example, the VFD 120 is mounted in an enclosure 300 that is substantially aligned axially with the axial field rotary energy device 110. The VFD 120 is axially offset or in a different axial plane than the device 110.

The embodiment of FIG. 5 can have the VFD enclosure 300 attached to the axial field rotary energy device enclosure 200 with one or more brackets 310. The brackets 310 can provide spacing to accommodate an impeller or cooling fan 320 between the axial field rotary energy device enclosure 200 and the VFD enclosure 300. In some embodiments, a conduit 330 can provide a path for power cables, harnesses, etc., connecting the axial field rotary energy device to the VFD. Whereas FIG. 5 shows one conduit 330, other embodiments may have two or more conduits. As an example, an embodiment can have a first conduit for power cables and a second conduit for sensor cables. The enclosure 300 can have an access port, such as a removable lid 302, that can provide access to service the VFD.

The VFD integrated system embodiment of FIG. 5 can be provided, as an example, to provide an ingress protection rating of IP55, as per international standard EN 60529 for both the VFD enclosure 300 and the axial field rotary energy device enclosure 200. Other embodiments may have a different ingress protection rating, such as IP20, IP22, or any other protection rating as per standard EN60529 or its equivalent national standards. The separate VFD and PM axial field rotary energy device enclosure configuration shown in FIG. 5 can also allow for having different ingress protection ratings for the axial field rotary energy device enclosure and the VFD enclosure. Examples include IP55 for the VFD enclosure and IP44 for the axial field rotary energy device enclosure or any other combination thereof.

Figures 6A, 6B:
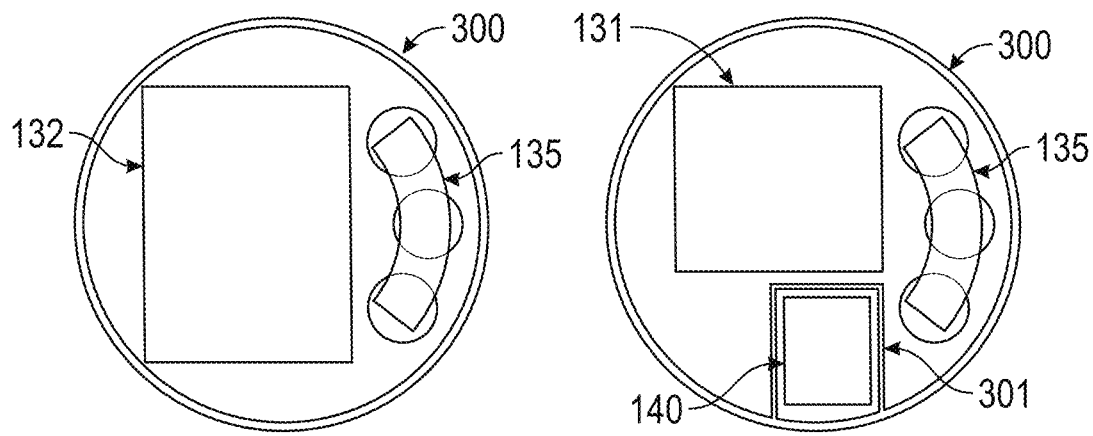
FIGS. 6A-6D are schematic front views of alternate embodiments of a VFD enclosure showing VFD modules.

FIG. 5 depicts the VFD as housed in a separate enclosure 300. The VFD modules (e.g., rectifier, DC bus, inverter, control, I/O modules, line inductors, etc.) can be arranged in various configurations. FIG. 6A shows one embodiment of the VFD where the rectifier, DC bus, inverter, control, and I/O modules are combined as one single PCBA 132 inside the VFD enclosure 300 and the line inductors form a separate assembly 135.

FIG. 6B shows another embodiment where the rectifier, DC bus, inverter and control modules are combined as one PCBA 131, whereas the I/O module 140 has its own PCBA housed in a separate partition 301 of the enclosure 300. In this embodiment, the partition 301 can have its own access port separate from the VFD enclosure access port (e.g., lid 302 shown in FIG. 5), which can provide access to the I/O module 140 without exposing the other modules of the VFD.

Figure 6C:
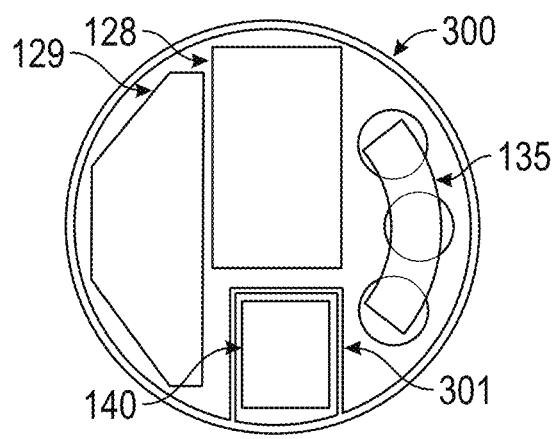

FIG. 6C shows another embodiment where the inverter and control modules are combined as one PCBA 128, the rectifier and DC bus modules are combined as another PCBA 129, and the I/O module 140 has its own PCBA housed in a separate partition 301 of the enclosure 300. In this embodiment, the partition 301 can have its own access port separate from the VFD enclosure lid 302 shown in FIG. 5 to provide access to the I/O module 140 without exposing the other modules of the VFD.

Figure 6D:
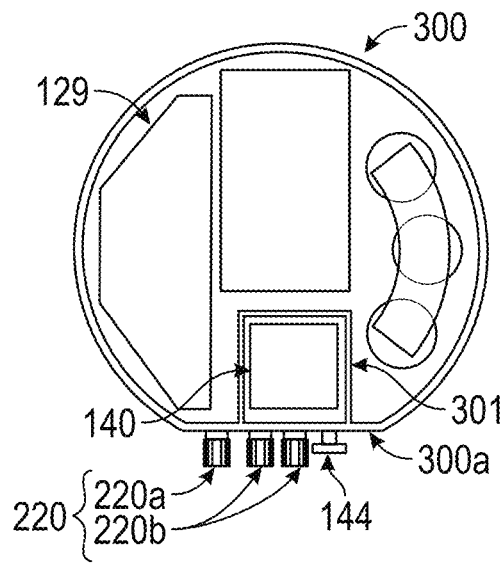

FIG. 6D shows an alternate embodiment of the VFD integrated system shown in FIG. 6C, where the enclosure 300 can have a substantially flat face 300a adjacent to the partition 301 that provides a mounting surface to pass-throughs 220. In this example, the pass-through 220a can be used to bring power cables through the housing 300 to be connected to the rectifier PCBA 129, and the pass-throughs 220b can be used to bring signal I/O cables into partition 301 to be connected to the I/O module 140. The flat face 300a can also provide a mounting surface for an antenna 144 connected to the I/O module 140. The antenna 144 can provide connectivity to a wireless network thereby providing a wireless I/O to the VFD integrated system.

Whereas FIGS. 6A-6D show several embodiments of the VFD mounted in a separate enclosure 300, other arrangements are possible. As examples, the VFD may not have line inductors, or each module of the VFD can have its own separate PCBA.

Figure 7A:
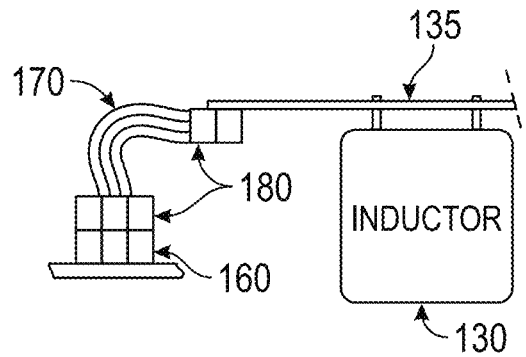
FIGS. 7A-7B are schematic views of embodiments of connections between VFD modules.
Figure 7B:
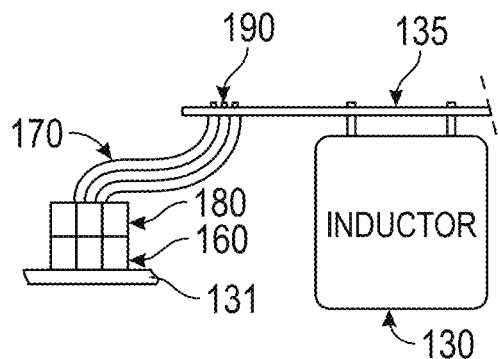

Embodiments of the connection between the PCB stator and the PCB that interconnects the line inductors may be accomplished through a cable harness with electrical connectors on both ends. For example, FIG. 7A includes a line inductor 130 that forms an assembly with the PCB 135 which is connected to the PCB stator terminals 160 via a cable harness 170 with electrical connectors 180 on both ends. In some applications, however, it may be desired to have the cable harness permanently connected to either the stator PCB or the PCBA that interconnects the line inductors. FIG. 7B shows an embodiment of the latter, where the cable harness 160 is coupled to stator terminals 160 via an electrical connector 180 and connected to the inductor PCB 135 via a soldered connection 190. The connection can be a male-female connector that can be disconnected and re-connected without special tools. Permanent connections that cannot be easily undone, such as a soldered connection or a crimped connection, also can be used. Similarly, the connection between the output of the inverter module of the VFD and the PCBA that interconnects the line inductors can be accomplished, in one version, via a cable harness with connectors on both ends, or on one end only with the other end permanently connected to the inductor PCBA or the inverter module PCBA.

It should be understood that in those embodiments where the various modules of the VFD are mounted in separate PCBAs, the connection between the various modules also can be accomplished via cable harnesses with connectors on both ends of the cable harnesses. Alternatively, cables harnesses can be permanently connected on one end to a first PCBA and with a connector on the other end to connect to a second PCBA. For embodiments where the line inductors are absent, a cable harness can connect the output of the inverter to the PCB stator terminals. The harness may have connectors on both ends or on only one end. Furthermore, in some embodiments, the connections between various VFD modules, line inductors and stator PCB can be achieved by means of flexible PCBs soldered and/or coupled at each end.

Figure 8A:
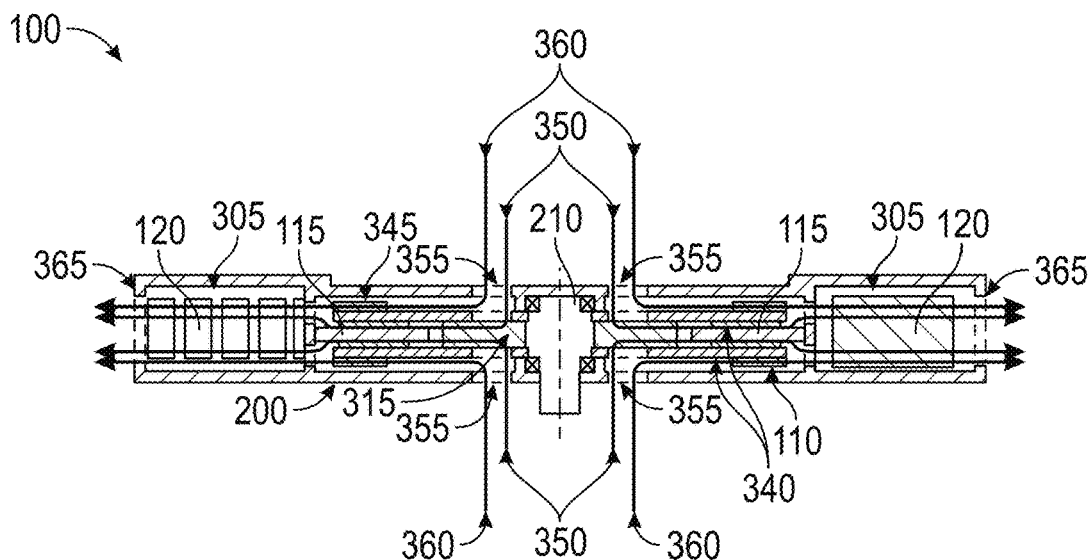
FIGS. 8A-8B are sectional views of embodiments of the VFD integrated system of FIG. 3 depicting first and second cooling air flow configurations.

FIG. 8A shows a sectional view of an embodiment of the VFD integrated system 100 of FIG. 3. The VFD 120 can be located around and substantially on the same plane as the axial field rotary energy device 110 in a common enclosure 200. In this embodiment, the axial field rotary energy device can have a first air circulator, such as a fan or impeller 315, mounted between the two discs 340 that comprise the rotor. As the rotor rotates, the first impeller 315 can generate a first air flow 350 that can enter the axial field rotary energy device through air intakes or ventilation openings 355 circumferentially distributed relatively to the shaft 210 on one or both ends of the enclosure 200. The air flow can circulate between the two discs 340 and radially over the surfaces of the PCB stator 115. The air flow can enter the volume 305 that houses the VFD 120, and ultimately can exit the enclosure 200 radially through peripheral openings 365, as shown in FIG. 8A.

In some embodiments, the first air flow 350 may exit the enclosure 200 radially at one or more of the four corners through openings in the cooling fin blocks 205 (FIG. 3). In other embodiments, the first air flow 350 may exit the enclosure 200 radially through other openings located in the periphery of the enclosure 200, axially through openings on one or both end faces of the enclosure 200, or a combination thereof.

In some embodiments, a second series of impellers 345 may be mounted on the back side of the rotor discs 340 as shown in FIG. 8A. As the rotor rotates, the second impellers 345 can generate a second air flow 360 that can enter the axial field rotary energy device through ventilation openings 355 on one or both ends of the enclosure 200. Ventilation openings 355 can be circumferentially distributed relatively to the shaft 210. The air flow can circulate between the discs 340 and the adjacent walls of the enclosure 200. The air flow can enter the volume 305 that houses the VFD 120, and can exit the enclosure 200 radially through peripheral openings 365, as shown in FIG. 8A.

In some embodiments, the second air flow 360 may exit the enclosure 200 radially at one or more of the four corners through openings in the cooling fin blocks 205 (FIG. 3). In other embodiments, the second air flow 360 may exit the enclosure 200 radially through other openings located in the periphery of the enclosure 200, axially through openings on one or both end faces of the enclosure 200, or a combination thereof.

Figure 8B:
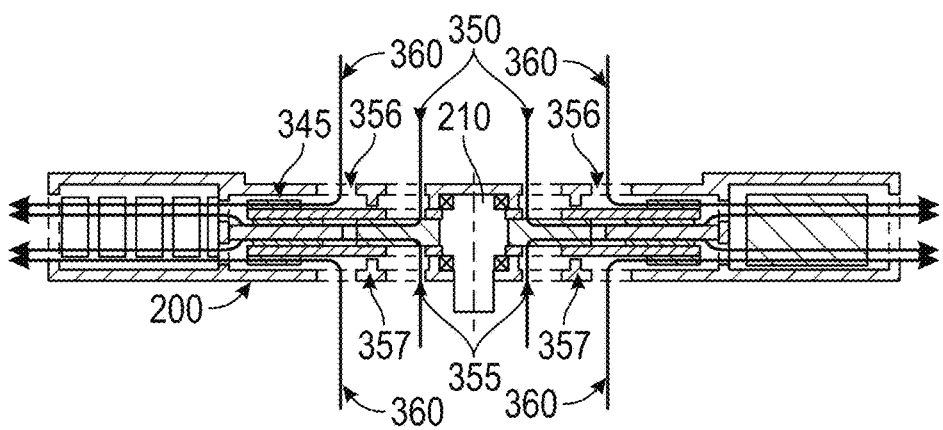

FIG. 8B shows an alternate embodiment where the second air flow 360 generated by the impellers 345 can enter the enclosure 200 through a second set of ventilation openings 356 circumferentially distributed relative to the shaft 210 at a radius larger than the radius where the ventilation openings 355 are located. In some embodiments, the enclosure 200 can have air baffles 357 between the openings 355 and 356 to separate the first air flow 350 entering the enclosure 200 through ventilation openings 355 from the second air flow 360 entering the enclosure 200 through ventilation openings 356.

Figure 9:
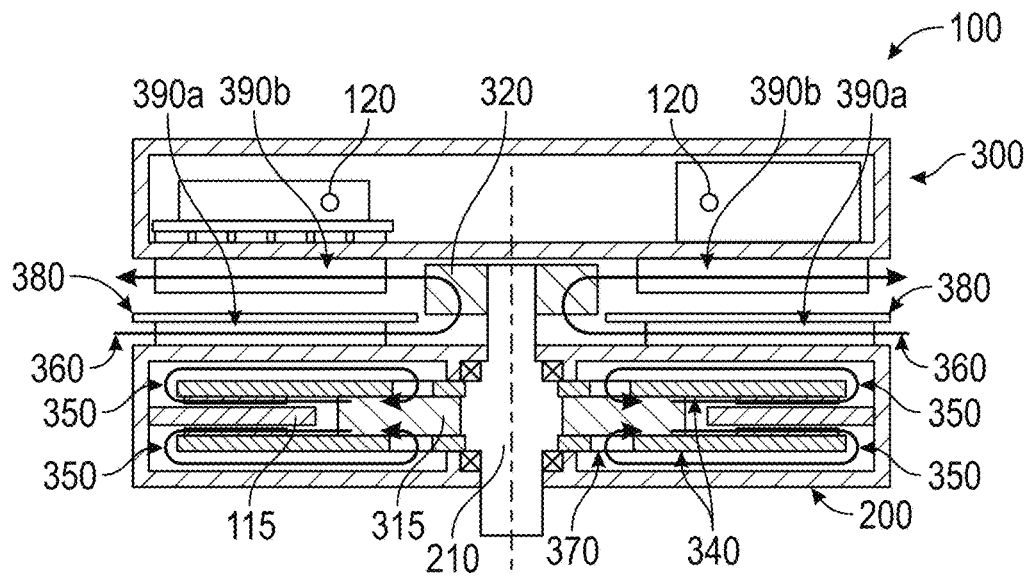
FIG. 9 is a sectional view of an embodiment of the VFD integrated system of FIG. 5 depicting one cooling air flow configuration.

FIG. 9 shows an embodiment of FIG. 5, where the VFD 120 can be located in a different axial plane than that of the axial field rotary energy device. The axial field rotary energy device enclosure can have an ingress protection rating of IP55. In this embodiment, the axial field rotary energy device can have a first impeller 315 mounted between the two rotor discs 340 that comprise the rotor. As the rotor rotates, the first impeller 315 can generate a first air flow 350 that flows radially outward in the air gaps between the rotor discs 340 and the surfaces of the stationary PCB stator 115. The air flow can return radially toward the center of the rotor in the space between the rotor disks 340 and the inner walls of the enclosure 200, where it returns to the first impeller 315 through circumferentially distributed openings 370.

The embodiment shown in FIG. 9 can have a second impeller 320, which can comprise a cooling fan, coupled to the shaft 210 in the axial space between the axial field rotary energy device enclosure 200 and the VFD enclosure 300. The second impeller 320 can form a second airflow 360 that can radially enter the axial space between the axial field rotary energy device enclosure 200 and an air baffle 380, flowing around fins 390a attached to the axial field rotary energy device enclosure 200. The air flow can circulate radially outward between the external wall of the VFD enclosure 300 and the air baffle 380, while flowing around the fins 390b extending from the VFD enclosure 300, thereby helping to cool the components of the VFD 120.

Figure 10A:
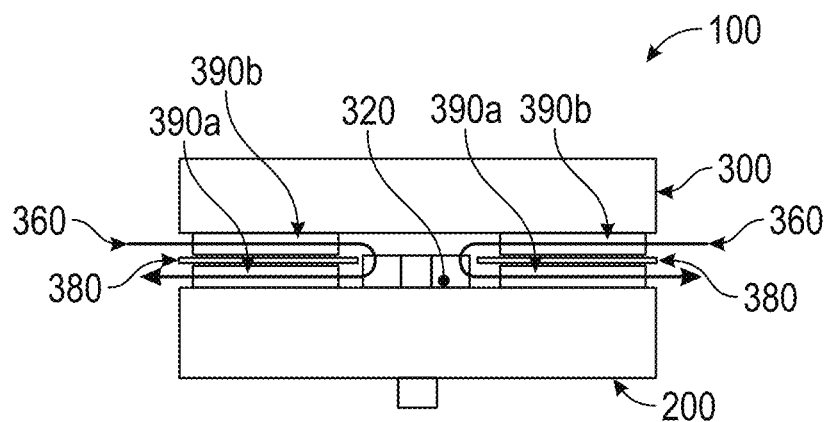
FIG. 10A-E are schematic views of embodiments of the VFD integrated system of FIG. 5 depicting alternate cooling configurations.

Depending on the cooling needs of the VFD integrated system 100, other air circulation patterns are possible for the embodiment shown in FIG. 5. For example, this can be done by rearranging the cooling fan 320 and the air baffle 380. In another example, FIG. 10A shows an alternative air circulation pattern where the cooling fan 320 is located substantially near the axial field rotary energy device enclosure 200. In this version, cooling fan 320 can generate air flow that enters the space between the external radial wall of the VFD enclosure 300 and the air baffle 380, flowing over fins 390b extending from the VFD enclosure 300. The air flow can circulate radially outward between the external wall of the axial field rotary energy device enclosure 200 and the air baffle 380, flowing over fins 390a extending from the axial field rotary energy device enclosure 200.

Figure 10B:
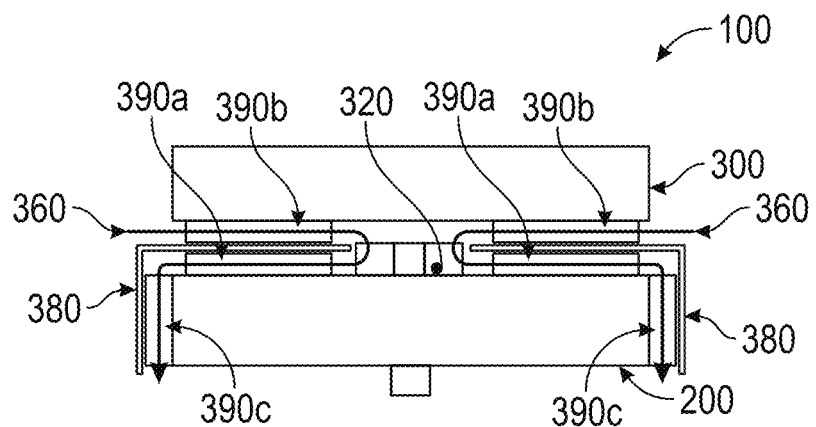

FIG. 10B (and a reverse flow counterpart, FIG. 10E) show other examples of air circulation for the VFD integrated system 100 shown in FIG. 5. In this case, the air baffle 380 can extend substantially axially along and around the outer perimeter of the axial field rotary energy device enclosure 200, forming an air passage around the enclosure 200. The cooling fan 320 can be located substantially near the enclosure 200 and can generate an air flow 360 that can enter the space between the external wall of the VFD enclosure 300 and the air baffle 380 flowing over fins 390b. The air flow can circulate radially outward between the external wall of the enclosure 200 and the air baffle 380, and flow around fins 390a. Guided by the air baffle 380, the air flow can be directed substantially axially along the outer perimeter of the enclosure 200 in the space between the enclosure 200 and air baffle 380. This air flow can circulate around a second set of fins 390c extending from the periphery of the enclosure 200. The air flow can then exit at the drive end of the VFD integrated system 100.

Figure 10C:
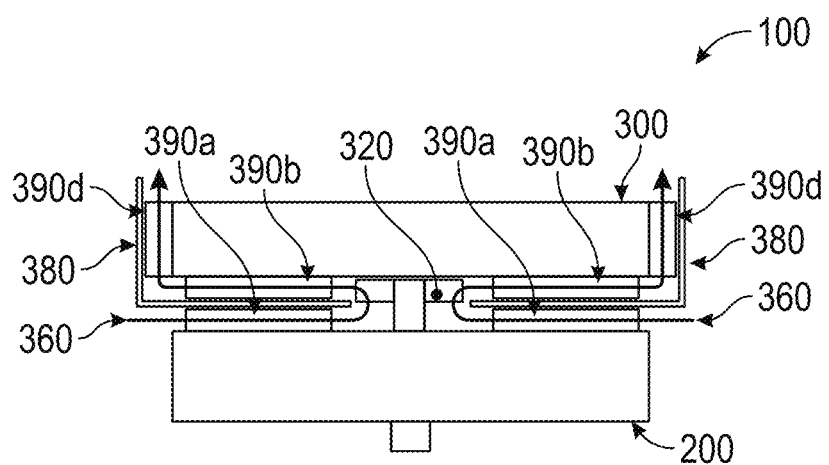

FIG. 10C shows another example of air circulation for the VFD integrated system 100 of FIG. 5. The air baffle 380 can extend substantially axially along and around the outer perimeter of the VFD enclosure 300 to form an air passage around the VFD enclosure 300. The cooling fan 320 can be located substantially near the VFD enclosure 300 and generate an air flow 360 that enters the space between the external wall of the PM axial field rotary energy device enclosure 200 and the air baffle 380. The air can flow around fins 390a, then radially outward between the external wall of the VFD enclosure 300 and the air baffle 380, around a first set of fins 390b. The air flow can be guided by the air baffle 380, turn in a direction substantially axial, and flow axially along the outer perimeter of the VFD enclosure 300 in the space between the VFD enclosure 300 and the air baffle 380. The air flow can circulate around another set of fins 390d extending from the periphery of the VFD enclosure 300, and then exit at the non-drive end of VFD integrated system 100.

Figure 10D:
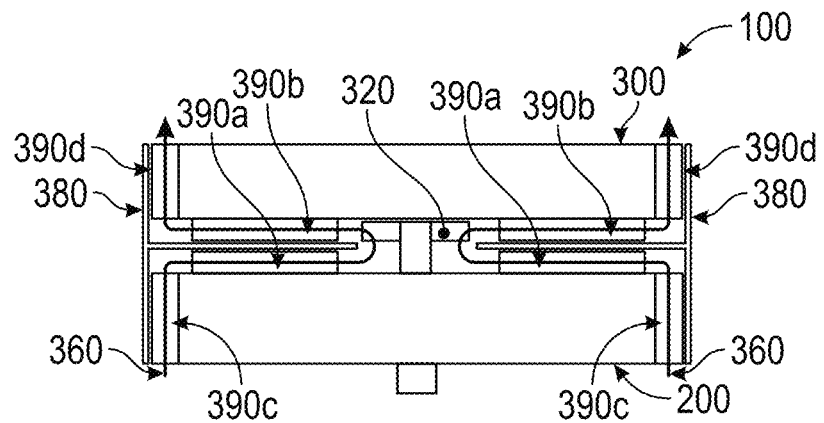
Figure 10E:
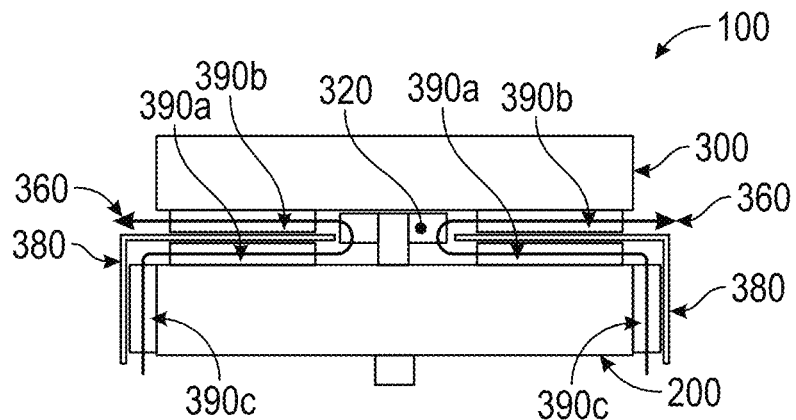

FIG. 10D shows another example of air circulation 360 in the VFD integrated assembly 100 of FIG. 5. The air baffle 380 can extend substantially axially along and around the outer perimeter of the enclosure 200 and VFD enclosure 300 to form air passages around both enclosures 200, 300. The cooling fan 320 can be located substantially near the VFD enclosure 300 and can generate air flow 360 to enter the space between the outer perimeter of the enclosure 200 and the air baffle 380. The air can flow around fins 390c and be guided by the air baffle 380. The air can flow radially inward between the enclosure 200 and the air baffle 380, flowing around fins 390a. The air can then flow radially outward between the VFD enclosure 300 and the air baffle 380, flowing around fins 390b. Guided by the air baffle 380, the air can turn to substantially axial flow along the outer perimeter of the VFD enclosure 300 in the space between the VFD enclosure and the air baffle 380. The air can flow around fins 390d and exit at the non-drive end of the VFD integrated system 100.

FIGS. 9 and 10A-10E depict several possible embodiments of air flows for the VFD integrated system 100. However, it should be understood that other embodiments of air circulation not described herein with different combinations of cooling fan location (e.g., substantially near the enclosures 200, 300), and air baffle geometry (e.g., extending axially along the enclosures 200, 300, or both) are possible. Although these examples include fins, it should be understood that some embodiments may have fins only on the enclosure 200 or 300, and variations where the fins are located only on the outer perimeter of the enclosures 200, 300 also are possible.

The examples in FIGS. 5, 9 and 10A-10D depict embodiments of the VFD integrated system 100 with enclosures that are consistent with ingress protection rating IP55. Other ingress protection ratings can be achieved, such as IP56 or IP65.

Figure 11:
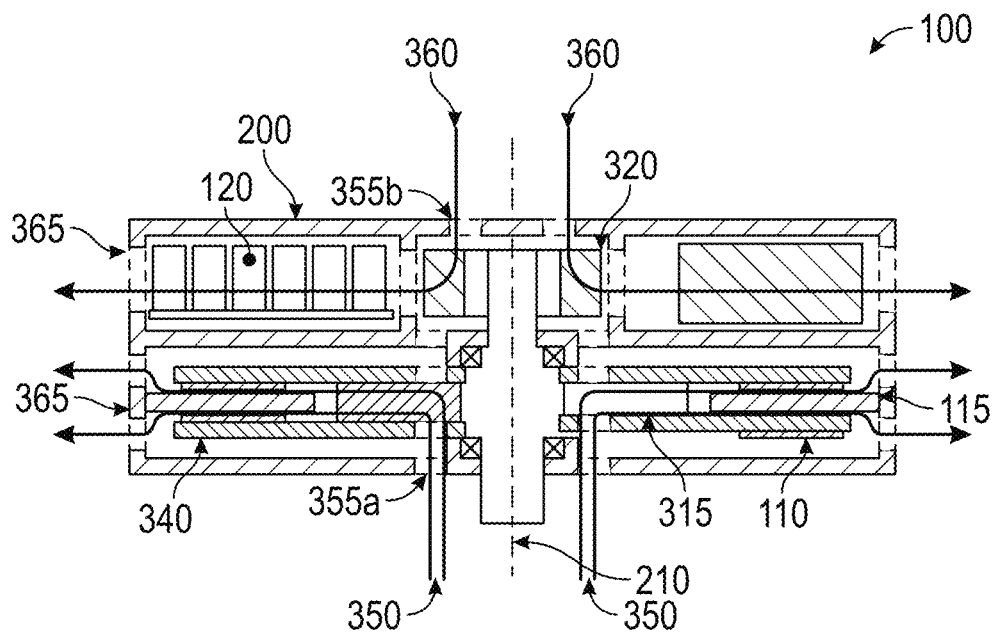
FIG. 11 is a sectional view of an embodiment of the VFD integrated system depicting a cooling air flow configuration.

FIG. 11 shows an embodiment of the VFD integrated system 100 where the axial field rotary energy device 110 and the VFD 120 are substantially axially aligned, and located on different planes. They can be integrated in a common enclosure 200 with ingress protection rating IP20. The enclosure 200 can define at least two separate spaces. One space can contain the axial field rotary energy device 110 and the other space can contain the VFD 120. In some versions, the axial field rotary energy device 110 can have a first impeller 315 mounted between the two discs 340 that comprise the rotor. As the rotor rotates, the first impeller 315 can form a first air flow 350 that can enter the axial field rotary energy device 110 through ventilation openings 355a, which can be circumferentially distributed relatively to the shaft 210 on the drive end of the enclosure 200. The air can flow between the two discs 340 and radially over the surfaces of the PCB stator 115. The air flow can exit the enclosure 200 radially through peripheral openings 365. In some embodiments, a second impeller 320 can be included, such as mounted on a shaft extension. As the rotor rotates, the second impeller 320 can generate a second air flow 360 that can enter the enclosure 200 through a second set of ventilation openings 355b circumferentially distributed relatively to the shaft 210 on the non-drive end of the enclosure 200. The air can flow into the volume that houses the VFD 120, and can exit the enclosure 200 radially through peripheral openings 365.

Figure 12:
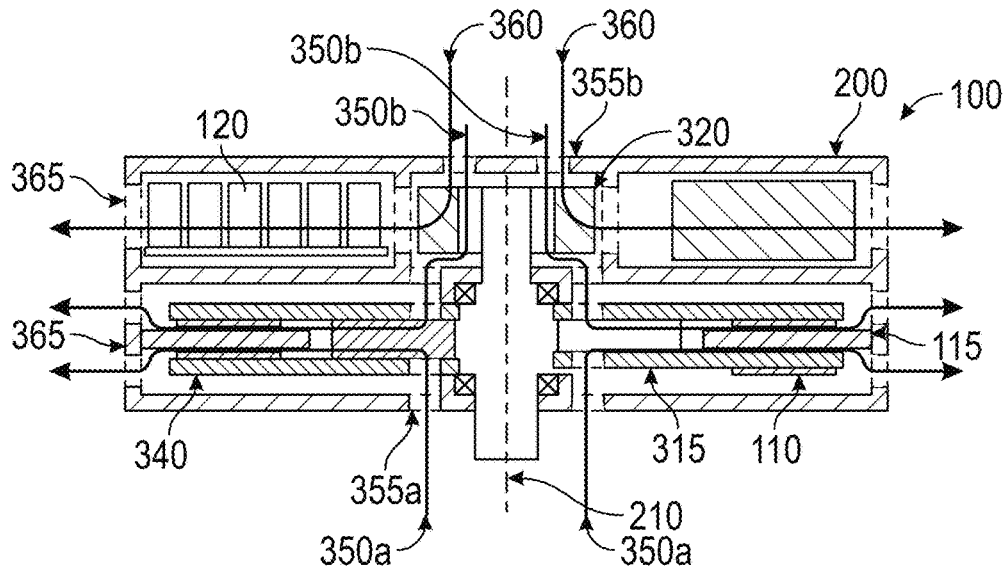
FIG. 12 is a sectional view of an alternate embodiment of the VFD integrated system of FIG. 11 depicting an alternate cooling air flow configuration.

In the alternate embodiment of FIG. 12, the first impeller 315 can generate a first air flow in two streams. The first stream 350a can enter the axial field rotary energy device 110 through ventilation openings 355a circumferentially distributed relatively to the shaft 210 on the drive end of the enclosure 200. The second stream 350b can enter the axial field rotary energy device 110 through ventilation opening 355b circumferentially distributed relative to the shaft 210 on the non-drive end of the enclosure 200. The two streams can merge at the first impeller 315, can flow between the two discs 340 and radially over the surfaces of the PCB stator 115, and can exit the enclosure 200 radially through peripheral openings 365. The second impeller 320 can have features to separate the second stream 350b of the first air flow from the second air flow 360, as the air flows enter the enclosure 200 through the ventilation openings 355b.

Figure 13:
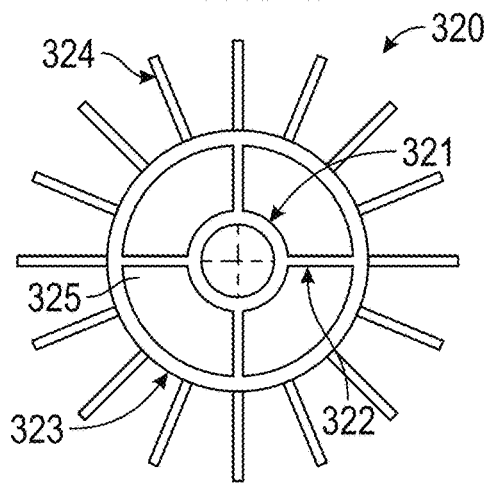
FIG. 13 is a simplified front view of an embodiment of an impeller for a VFD integrated system.

FIG. 13 show an embodiment of the second impeller 320 with some features. The second impeller 320 can have a hub 321 with an axial bore for mounting on the axial field rotary energy device shaft extension. The hub 321 can have a plurality of radial fins 322 that support a substantially cylindrical tube 323 that is coaxial with the hub 321. Tube 323 can support a plurality of radial fins or blades 324 that can propel the air radially as the impeller 320 rotates, thereby generating the second air flow 360 depicted in FIG. 12. The circumferential space between the hub 321 and the tube 323 can provide openings 325 for the second stream of the first air flow 350b to move axially from the enclosure openings 355b to the first impeller 315, as shown in FIG. 12.

Referring again to FIG. 12, the second airflow 360 generated by the blades 324 of the second impeller 320, can enter the enclosure 200 through ventilation openings 355b, which can be circumferentially distributed relatively to the shaft 210 on the non-drive end of the enclosure 200. The air can flow into the volume that houses the VFD 120, and can exit the enclosure 200 radially through peripheral openings 365.

These embodiments can have an ingress protection rating IP20. Other protection ratings, such as IP22, IP32, IP44 and still others, also can be achieved. For example, these embodiment can include screens and/or louvers adjacent the ventilation openings 355a and 355b.

The embodiments can have a second impeller 320, which can be mounted on a shaft extension. Other embodiments can have a fan powered by an electric motor attached to the enclosure 200. The fan can generate the air flow 360. Some embodiments may not include the second impeller 320 and the shaft extension.

In some embodiments, the impeller 320 depicted in FIG. 13 can have the radial fins 322 shaped to generate a substantially axial air flow. Alternatively, the radial blades 324 can be shaped as air foils to generate a substantially radial air flow, or a combination thereof.

Figure 14:
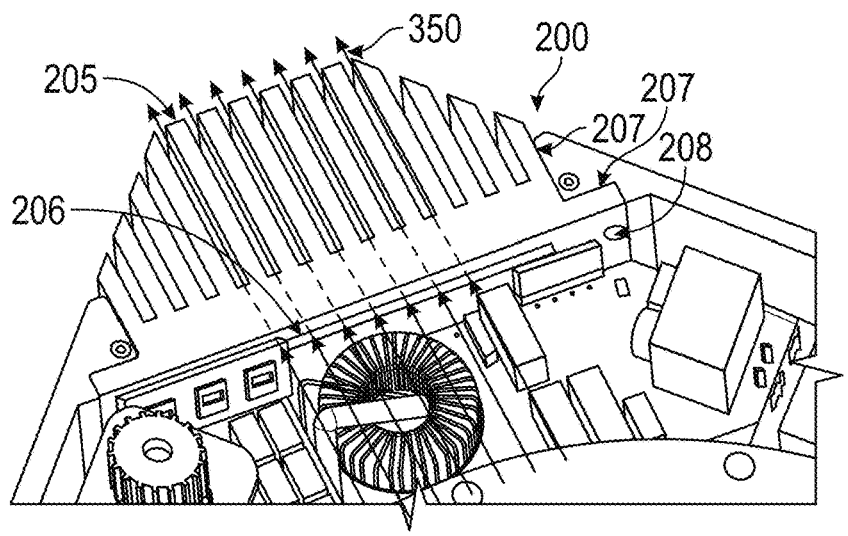
FIG. 14 is a partial isometric view of an embodiment of an enclosure for the VFD integrated system of FIG. 3.

The embodiments can include cooling fin blocks 205 (see, e.g., FIGS. 2-4 and 14) in one or more of the four corners of the enclosure. The cooling fin blocks 205 can have features to facilitate and or align their attachment, such as machined surfaces 207 (FIG. 14), and tapped holes 208 for fasteners. The embodiments can have cooling fin blocks 205 formed from modular blocks of thermally conductive metals, such as aluminum or copper. They can be extruded, cast or machined, for example. The cooling fin blocks 205 can have openings or slits 206 at their bases that can allow the air flow 350 generated by the rotor impellers to exit the enclosure 200. At least one of cooling fin blocks 205 can be removable, so other elements can be attached to the assembly to provide alternate cooling methods.

Other embodiments can have cooling fin blocks 205 with no slits 206 at the bases. When such blocks 205 are mounted to the enclosure 200, they can seal openings of the enclosure 200 at the corners. In such embodiments, the ventilation openings 355, 356 shown in FIGS. 8A and 8B, at both ends of the enclosure 200 may be absent. In such cases, the assembly can be totally enclosed, achieving an ingress protection rating IP55 or IP56. These versions can be desirable for applications where the assembly can be installed in a hazardous environment, such as a National Electric Code Class 1 Division 1 location, as an example.

Figure 15:
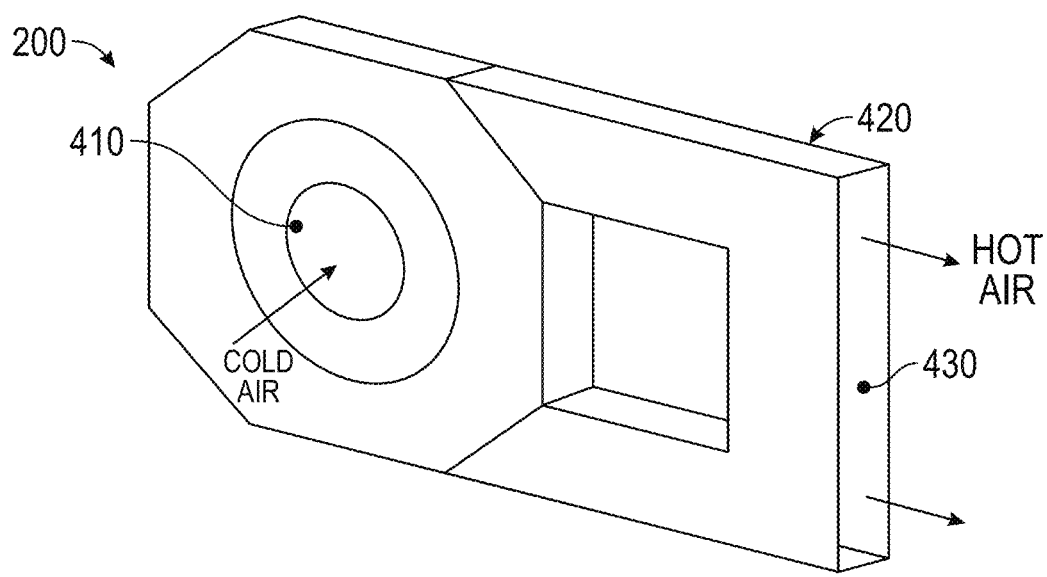
FIG. 15 is a schematic isometric view of an embodiment of a VFD integrated system with an air duct inlet and outlet.

FIG. 15 shows an embodiment where the enclosure 200 has an air inlet 410 on one side of the enclosure that allows cool air to enter the enclosure. A duct 420 can be attached to two of the enclosure corner openings, for example, to provide an air outlet 430. The air outlet 430 can direct the hot air coming from the assembly to a convenient location, such as the exterior of a building or an air plenum. In some embodiments, the other two corners of the enclosure 200 can be sealed with lids. Other variations of these embodiments can have air ducts connected to all four openings of the enclosure, three openings or just one. Some embodiments may have a combination of cooling fin blocks and air ducts, such as those mounted to the corners of the enclosure. Still other embodiments may have the air ducts connected to openings on the sides of the enclosure, not on the corners.

Figure 16:
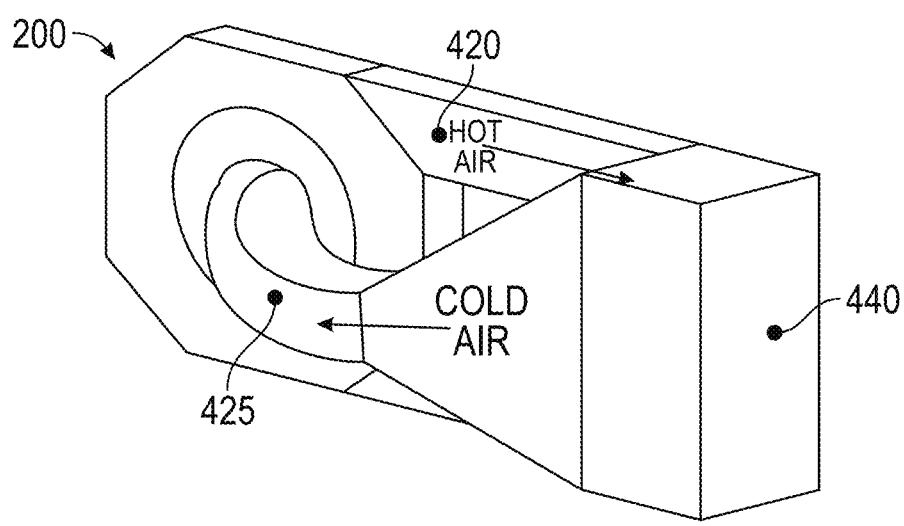
FIG. 16 is a schematic isometric view of an alternate embodiment of a VFD integrated system with an air duct inlet and outlet, and a heat exchanger.

FIG. 16 shows another embodiment of a VFD integrated system where a first air duct 420 is attached to two corners of the enclosure 200. It can direct hot air into a heat exchanger 440. A second air duct 425 can direct the cold air coming from the heat exchanger 440 back to the enclosure. The two remaining corners can be sealed with lids, for example. In some embodiments, the heat exchanger 440 can be an air-to-air hear exchanger, a water-to-air heat exchanger, or may have any other suitable cooling fluid to cool the air circulating through the assembly. In some embodiments, another set of ducts may be mounted to one or more corners of the enclosure with, for example, a second heat exchanger connected to them. Other embodiments may have the air ducts connected to openings on the sides of the enclosure, not on the corners.

These embodiments can provide a flexible VFD integrated system having a structure and enclosure that allows for various combinations of cooling schemes and configurations. The examples provided just a small set of possibilities.

Figure 17:
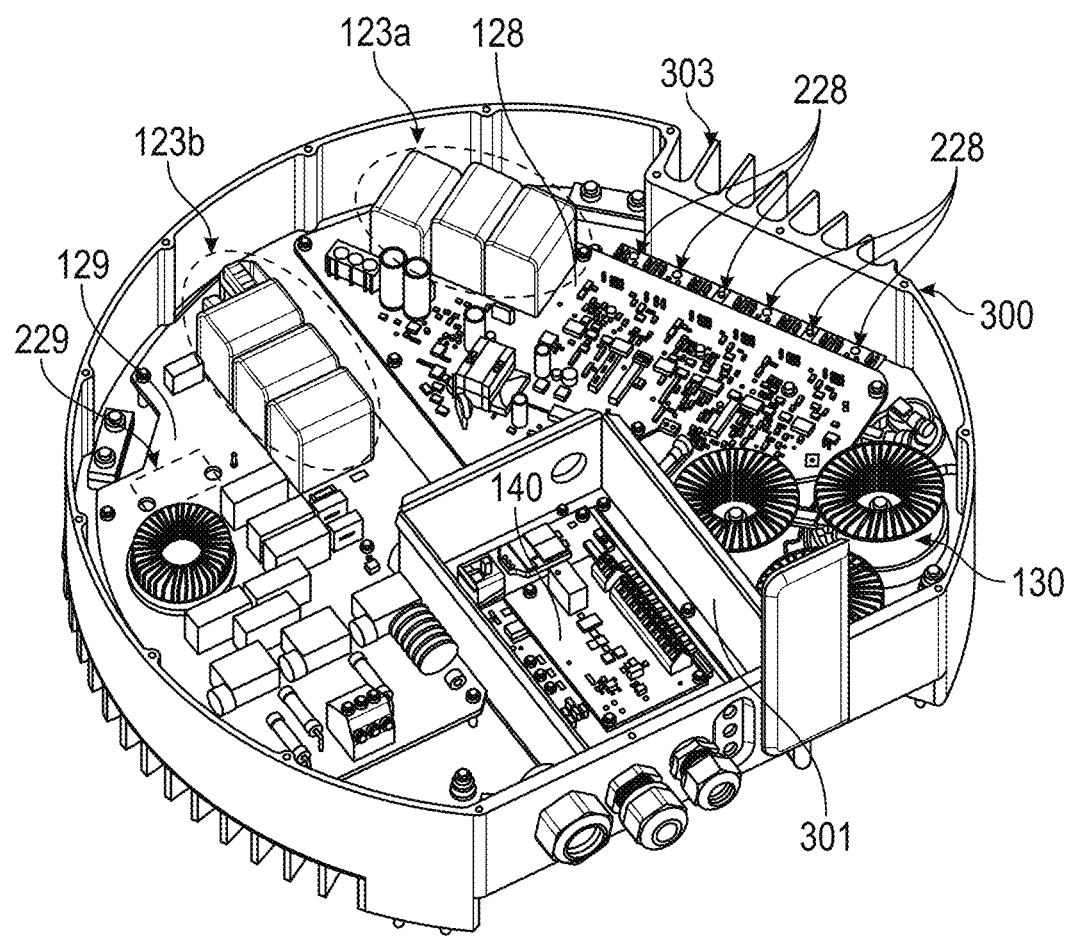
FIG. 17 is an isometric view of an embodiment of a VFD enclosure showing internal details.

FIG. 17 depicts an embodiment of a VFD enclosure 300 showing an inverter PCBA 128 that can comprise an inverter module, a control module, and capacitors 123a that form a first section of a DC bus. The VFD enclosure 300 also can include a rectifier PCBA 129 that can comprise a rectifier module and capacitors 123b to form a second section of a DC bus. The embodiment can have a partition 301 that comprises an I/O module 140. FIG. 17 is an example with two sections (i.e., capacitors 123a and 123b) of a DC bus that have the same number of capacitors and approximately the same capacitance (e.g., three 30 µF capacitors in each section totaling 180 µF for the whole DC bus). However, other embodiments can have these sections with an unequal number of capacitors and/or different capacitance values, such as one 50 µF capacitor in one section and two in the other section, totaling 150 µF. Another version can have one 30 µF capacitor in one section and five in the other section, totaling 180 µF. Still another example can have four 30 µF capacitors in one section and one 50 µF in the other section, totaling 170 µF. Other combinations of number of capacitors and capacitance values also may be had.

The enclosure 300 can be made of a metal or alloy, such as aluminum or steel, which can provide electromagnetic emission shielding for the VFD. In other embodiments, the enclosure 300 can be formed from a polymer (e.g., plastic) with, for example, embedded conductive mesh to provide electromagnetic emission shielding for the VFD.

The embodiment of the inverter PCBA 128 shown in FIG. 17 comprises six controlled switching devices 228 that form a 6-pulse, 3-phase, 2-level inverter bridge that modulates the output voltage of the inverter. The switching devices can be silicon carbide MOSFETs. However, other embodiments can have gallium nitride MOSFETs, or silicon based IGBTs. Furthermore, other embodiments can have a different number of switching devices depending on the inverter bridge configuration and number of phases. Another example can have 18 switching devices connected in a neutral point clamp configuration providing a 3-level, 3-phase output. Still another example can have 12 switching devices connected in parallel pairs where the pairs form a 6-pulse, 3-phase, 2-level inverter bridge. In other embodiments the inverter module 128 can have inverter bridge modules where each bridge module can comprise switching devices forming half bridges. In this example, three half bridge modules can form a 6-pulse, 3-phase, 2-level bridge. Furthermore, other embodiments can have inverter bridge modules comprised of switching devices that can form a complete 6-pulse, 3-phase, 2-level bridge. It should be understood that, in other embodiments, the inverter module 128 can have an output with one, two, four or more phases with two or three levels.

The rectifier PCBA 129 shown in FIG. 17 can have a rectifier bridge module 229 mounted, for example, on the lower side of the PCB. This can allow the rectifier bridge module 229 to be coupled directly to a thermal pad located on the bottom of the enclosure 300 to enhance heat transfer and cooling of the rectifier bridge module 229.

Figure 18:
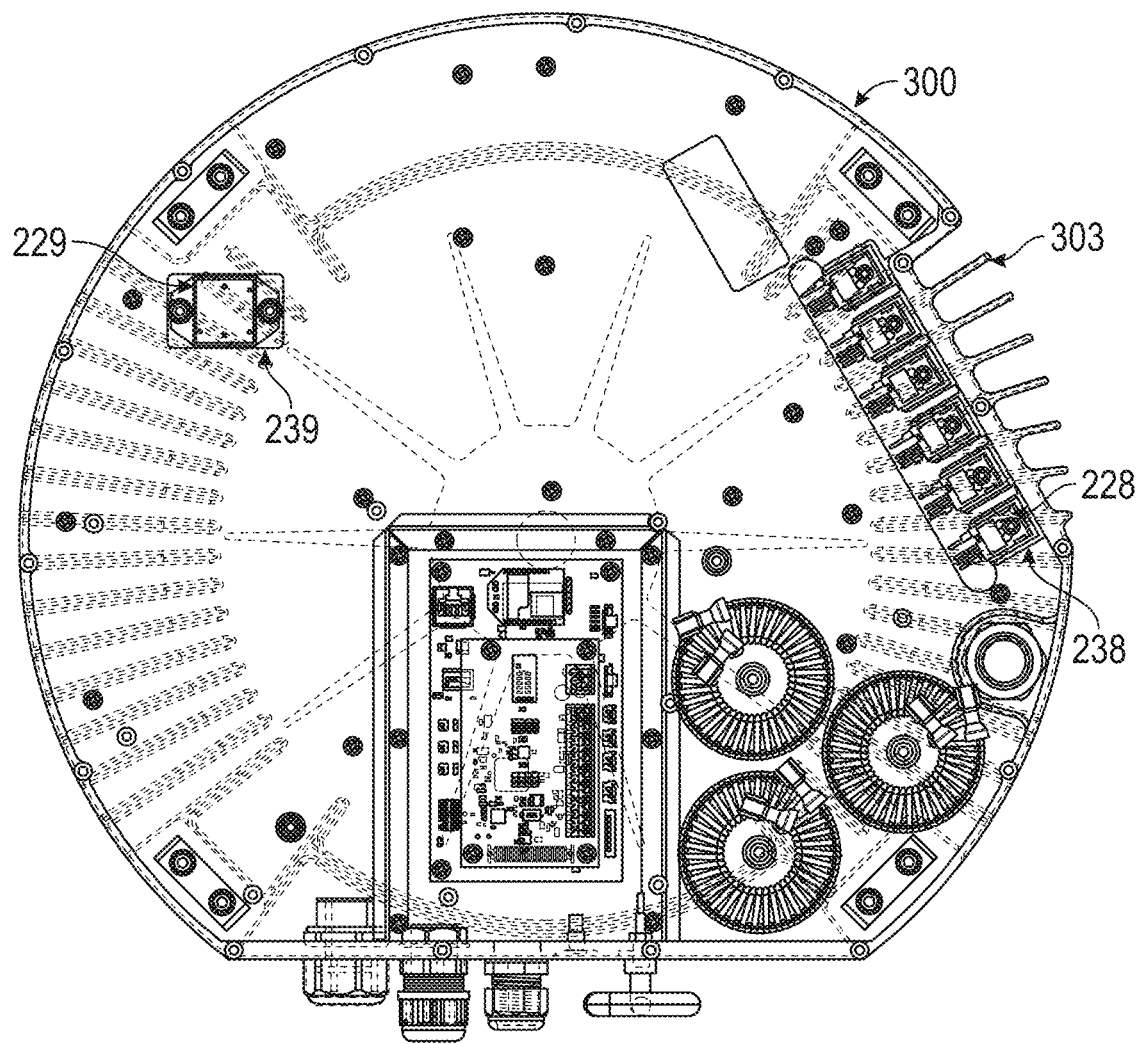
FIG. 18 is top view of an embodiment of a VFD enclosure with the rectifier and inverter printed circuit board assemblies (PCBA) removed to show details of the rectifier bridge module and the inverter switching devices.

FIG. 18 is a top view of the VFD embodiment of FIG. 17 with the rectifier PCBA 129 removed to show the rectifier bridge module 229 coupled to a thermal pad 239. The thermal pad 239 can be an integral or non-integral part of the enclosure 300, which can be formed from a thermally conductive material, such as aluminum. In other embodiments, the thermal pad 239 can be formed from a thermally conductive material such as aluminum, copper, graphite or different material than the enclosure 300. The thermal pad 239 may provide a heat removal path for the rectifier bridge module 229 and prevent it from overheating or reaching temperatures above a selected level.

Although FIGS. 17 and 18 show the rectifier bridge module 229 as part of the VFD rectifier module 129, other embodiments can have a rectifier bridge comprised of discrete diodes. Furthermore, some VFD embodiments can have an actively controlled rectifier bridge comprised of an actively controlled bridge module or, alternatively, they can comprise discrete switching devices, such as IGBTs or MOSFETs.

In some versions, the controlled switching devices 228 that are part of the inverter PCBA 128 can be arranged in a substantially linear pattern along one of the edges of the inverter PCBA 128. They also can be aligned along a substantially straight wall of the VFD enclosure 300. In some versions, the straight wall of the enclosure 300 can have lateral fins 303 that form a heat sink that can help dissipate the heat generated by the controlled switching devices 228 during operation.

Examples of the controlled switching devices 228 can be coupled to a thermal pad 238 to enhance their heat transfer to the enclosure 300 and its fins 303. FIG. 18 shows a view of the VFD embodiment of FIG. 17 where the inverter PCBA 128 is removed for clarity to show the switching devices 228 coupled to a thermal pad 238. The thermal pad 238 can be an integral or non-integral part of the enclosure 300. It can be formed from a thermally conductive material such as aluminum, copper, graphite or a material that differs from that of the enclosure 300. Although FIG. 18 shows one thermal pad 238 under each one of the switching devices 228, it should be understood that some embodiments can have one single thermal pad 238 coupled to all switching devices 228, and yet other embodiments can have two or three thermal pads 238 coupled to different numbers of switching devices 238.

Embodiments of the VFD enclosure 300 can have radial fins 304 (FIG. 19) on its bottom surface. A first set of fins 304a can be coupled to the lateral fins 303 to form a heat sink that can help dissipate the heat generated by the controlled switching devices 228. The VFD enclosure 300 can a have a second set of radial fins 304b, approximately diametrically opposed to the first set of fins 304a, to form a heat sink that can help dissipate the heat generated by the rectifier bridge module 229.

Figure 19:
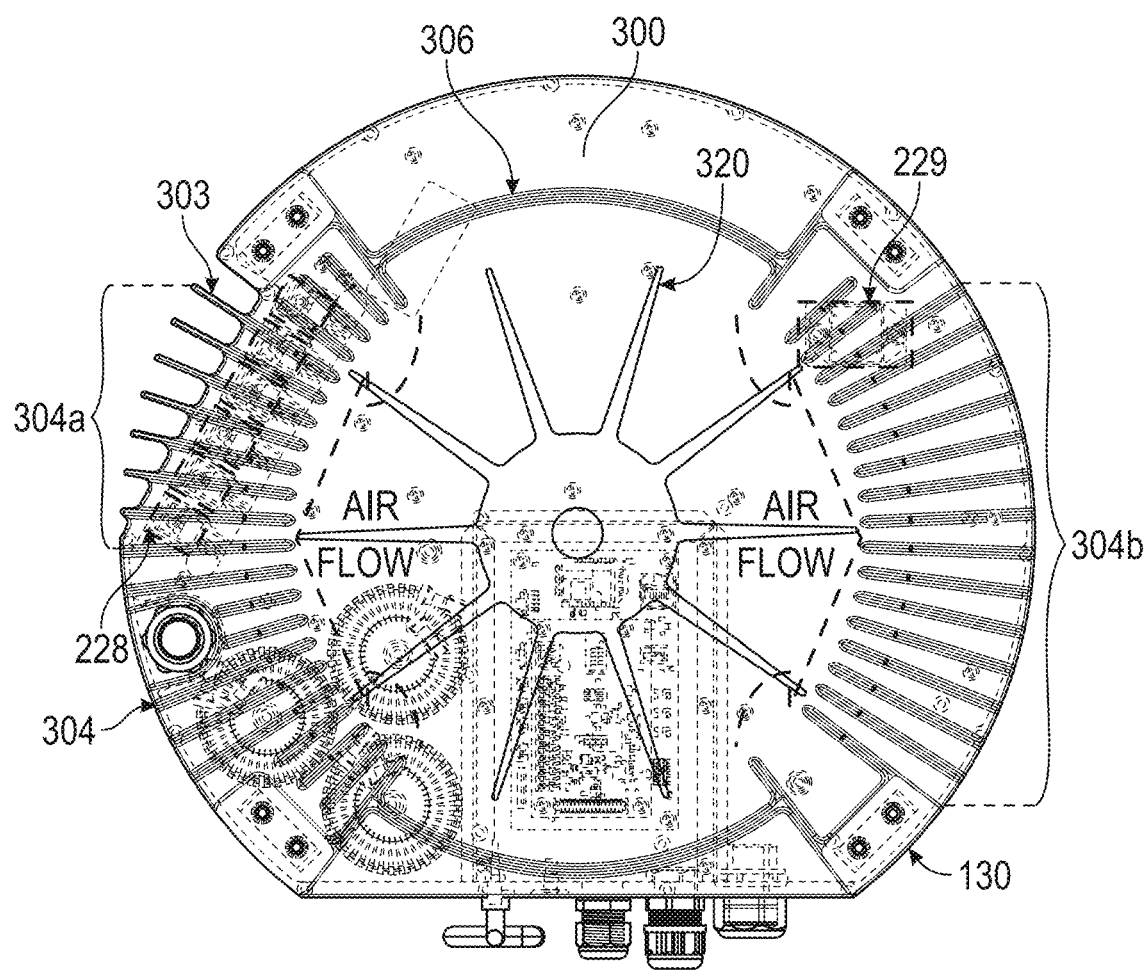
FIG. 19 is a bottom view of an embodiment of a VFD enclosure.

As shown in FIG. 19, versions of the VFD enclosure 300 can have baffles 306 that help direct the air flow (see arrows) generated by the rotation of the impeller or cooling fan 320 towards the radial fins 304 to enhance heat removal from the VFD enclosure 300.

Figure 20:
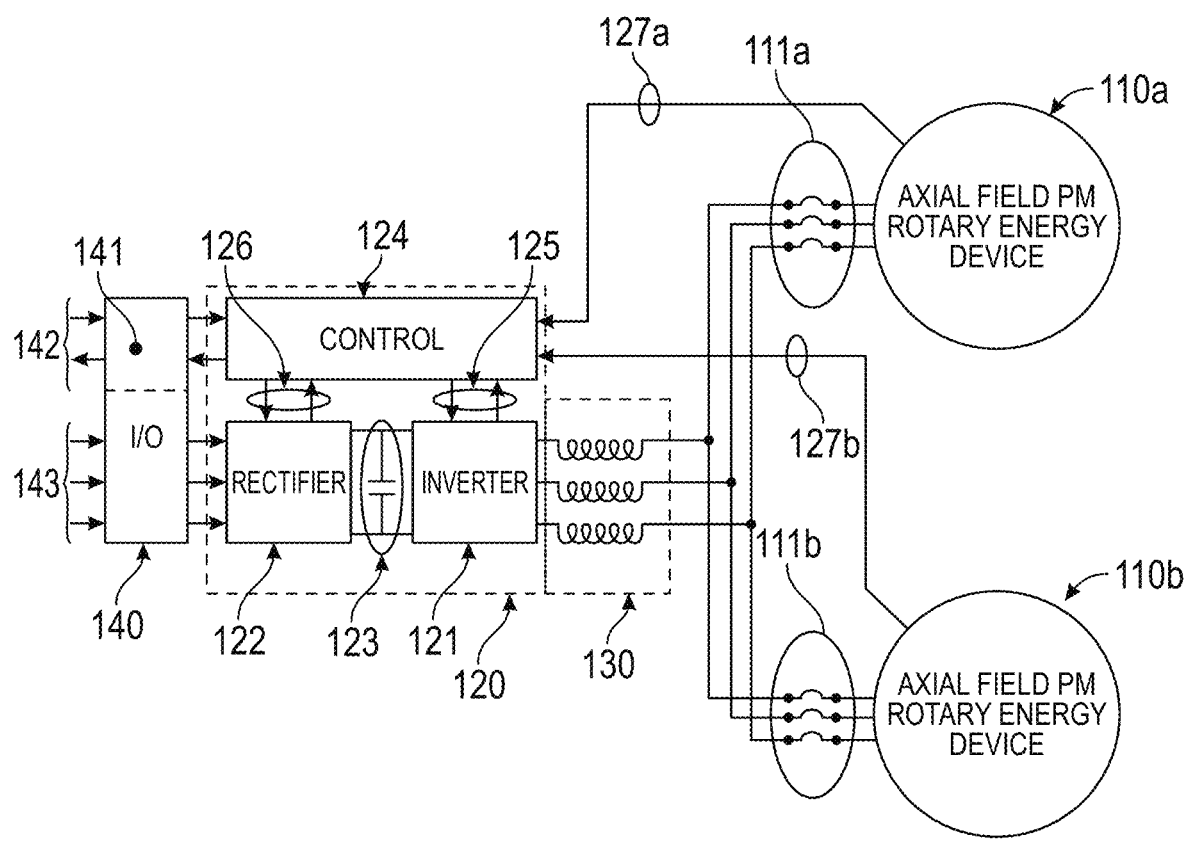
FIG. 20 is a schematic diagram of an embodiment of a system comprising two axial field rotary energy devices coupled to one VFD.

FIG. 20 shows a general schematic view of an embodiment of a VFD integrated system 500 where two axial field rotary energy devices 110a and 110b can be coupled to a common VFD 120 through line inductors 130 (also shown in FIG. 17). Some embodiments are similar to the system depicted in FIG. 1, where for example, the axial field rotary energy devices 110*a* and 110*b* can be connected directly to the inverter module 121 of the VFD 120. Although the example in FIG. 20 depicts two 3-phase axial field rotary energy devices 110*a*, 110*b*, other system arrangements are possible, such as just one or more than two field rotary energy devices, or devices with 1, 2 or 4, or more phases.

In the example shown in FIG. 20, each of the power lines connecting the axial field rotary devices 110*a*, 110*b* to the VFD 120 can have one contactor 111*a* and 111*b*, respectively, that is controlled by the control module 124. A contactor is an electrically controlled device that can interrupt a full load current. This allows for connection or disconnection of the axial field rotary energy devices 110*a*, 110*b*, as needed, depending on power demand of the driven equipment. In some embodiments, the contactor 111*a* may disconnect power between the axial field rotary device 110*a* and the VFD 120 while the contactor 111*b* connects power between the axial field rotary device 110*b* and the VFD 120, and vice versa. In other instances, both contactors 111*a* and 111*b* may connect power between the axial field rotary devices 110*a* and 110*b* and the VFD 120. In yet other instances, both contactors 111*a* and 111*b* may disconnect power between the axial field rotary devices 110*a* and 110*b* and the VFD 120.

Each of the axial field rotary energy devices 110*a* and 110*b* in the VFD integrated system 500 can have one or more sensors. For example, the sensors can include resistance temperature detectors (RTD), thermocouples, accelerometers, encoders, and other sensors. The sensors can be connected to the control module 124 of the VFD integrated system 500 via input lines 127*a* and 127*b*, respectively. The control module 124 may perform an operation in response to receiving and processing the sensor signals from the axial field energy devices 110*a*, 110*b*. For example, a temperature sensor in the axial field rotary energy device 110*a* may indicate that the stator temperature of that device is above a threshold temperature. In that case, the control module 124 may provide a command to the contactor 111*a* to disconnect the axial field rotary energy device 110*a* from the VFD 120. In another example, an external command to stop the axial field rotary energy device 110*b* can be received through the I/O connection 142 that the I/O module 140 can convey to the control module 124. In turn, the control module 124 can command the contactor 111*b* to disconnect the axial field rotary energy device 110*b* from the VFD 120. The contactors 111*a*, 111*b* can be located near the VFD 120. For example, they can be located in a common cabinet, or in a separate cabinet adjacent to the VFD 120.

The example of the VFD integrated system 500 depicted in FIG. 20 has a 3-phase power input that can be supplied to the I/O module 140 through connection 143. However, in some embodiments, the power can be supplied directly to the rectifier module 122, and completely bypass the I/O module 140. It should be understood that other embodiments can have a single phase input, or 2, 4 or more phases. Other embodiments can have a direct current (DC) input, in which case, the rectifier module 122 can be absent and the DC power can be supplied directly to the DC bus 123. In addition, input and output connection pairs 125 and 126 can couple the control module 124 to the inverter 121 and rectifier 122, respectively. The I/O module 140 can have an optional and configurable control interface 141 that can facilitate communication to an external control system via the set of input/output connections 142.

Other embodiments can include one or more of the following items.

1. A system, comprising:
   an axial field rotary energy device having an axis, a printed circuit board (PCB) stator and rotors having respective permanent magnets (PM), and the rotors are configured to rotate about the axis relative to the PCB stator;
   a variable frequency drive (VFD) comprising VFD modules electrically and mechanically coupled to the axial field rotary energy device, and the VFD has a phase input and a phase output;
   a device enclosure containing the axial field rotary energy device;
   a VFD enclosure containing the VFD, and the VFD enclosure comprises components to remove heat from the VFD; and
   a cooling system for cooling the axial field rotary energy device and the VFD.
2. The system wherein the VFD comprises a first PCBA having an inverter module consisting of silicon carbide MOSFETs, and a second PCBA having a rectifier module.
3. The system wherein the silicon carbide MOSFETs are mounted to a thermal pad coupled to the VFD enclosure.
4. The system wherein the thermal pad is formed from a thermally conductive material that is different from a material that forms the VFD enclosure.
5. The system wherein the thermal pad is integrally formed with the VFD enclosure.
6. The system wherein the silicon carbide MOSFETs are packaged as discrete devices.
7. The system wherein the silicon carbide MOSFETs are packaged as half-bridge modules.
8. The system wherein the silicon carbide MOSFETs are packaged as a 6-pulse-bridge module.
9. The system wherein the VFD comprises a DC bus having a first section coupled to an inverter module PCBA and a second section coupled to a rectifier module PCBA.
10. The system wherein the first and second sections of the DC bus comprise substantially the same capacitance value.
11. The system wherein the first and second sections of the DC bus comprise different capacitance values.
12. The system wherein the VFD housing further comprises a rectifier PCBA having a rectifier bridge packaged as a single module.
13. The system wherein the rectifier bridge module is mounted to a thermal pad coupled to the VFD enclosure.
14. The system wherein the thermal pad is formed from a thermally conductive material this is different from a material that forms the VFD enclosure.
15. The system wherein the thermal pad is integrally formed with the VFD enclosure.
16. The system wherein the rectifier PCBA has a rectifier bridge consisting of discrete devices.
17. The system wherein the rectifier bridge discrete devices are mounted to a thermal pad that is coupled to the VFD enclosure.
18. The system wherein the thermal pad is formed from a thermally conductive material this is different from a material that forms the VFD enclosure.
19. The system wherein the thermal pad is integrally formed with the VFD enclosure.

20. The system wherein the VFD has an I/O module that comprises at least one of Ethernet, Industrial Ethernet, RS485, WIFI, cellular or a Bluetooth communication interface.

21. A system, comprising:
    an axial field rotary energy device having an axis, a printed circuit board (PCB) stator, sensors for monitoring a status of the device, rotors having respective permanent magnets (PM), the rotors are configured to rotate about the axis relative to the PCB stator, and the axial field rotary energy device is mechanically enclosed in a device enclosure;
    a variable frequency drive (VFD) comprising VFD modules electrically coupled to the axial field rotary energy device, at least one VFD module comprises a VFD control module, and the VFD control module is coupled to sensors in the axial field rotary energy device; and
    a contactor coupled between the VFD and the axial field rotary energy device, and the contactor is configured to be independently controlled by the VFD control module.

22. The system wherein the VFD has one or more phases input.

23. The system wherein the VFD has a direct current (DC) input.

24. The system wherein the axial field rotary energy device can be electrically connected to and electrically disconnected from the VFD by closing and opening the contactor as controlled by the VFD control module.

25. The system wherein the VFD comprises an I/O module having at least one of Ethernet, Industrial Ethernet, RS485, WIFI, cellular or a Bluetooth communication interface.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drive (SSD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. A system, comprising:
   axial field rotary energy devices each having an axis, a sealed enclosure, a printed circuit board (PCB) stator, a sensor and rotors having respective permanent magnets (PM), and the rotors are configured to rotate about the axis relative to the PCB stator;
   a variable frequency drive (VFD) comprising one or more of:
   a rectifier module,
   DC bus,
   a communication (I/O) module, or
   line inductors connected to the output of the inverter module; and
   the inverter module,
   a control module,
   contactors coupled between the VFD and each of the axial field rotary energy devices and each contactor is configured to be independently controlled by the control module;
   wherein
   the VFD is electrically coupled to the axial field rotary energy devices, and the VFD separate from the sealed enclosures of the axial field rotary energy devices; and
   the control module is configured to receive signals from the sensor located in each of the axial field rotary energy devices and relay a command to a respective contactor to disconnect a respective axial field rotary energy device, if the parameter monitored by the sensor exceeds a set threshold.

2. The system of claim 1, wherein the sensor is a temperature sensor.

3. The system of claim 1, wherein
   the I/O module is configured to convey to the control module an external command to stop one or more of the axial field rotary energy devices.

4. The system of claim 1, wherein the VFD can selectively supply power to only one of the axial field rotary energy devices.

5. The system of claim 1, wherein the VFD is connected directly to a direct current source.

6. The system of claim 5, wherein the sensor is a temperature sensor.

7. The system of claim 5, wherein the I/O module is configured to convey to the control module an external command to stop one or more of the axial field rotary energy devices.

8. The system of claim 5, wherein the VFD can selectively supply power to only one of the axial field rotary energy devices.

* * * * *

UNITED STATES PATENT AND TRADEMARK OFFICE
CERTIFICATE OF CORRECTION

PATENT NO. : 12,328,046 B2
APPLICATION NO. : 17/972747
DATED : June 10, 2025
INVENTOR(S) : Randal A. Lee et al.

Page 1 of 1

It is certified that error appears in the above-identified patent and that said Letters Patent is hereby corrected as shown below:

In the Claims

Column 20, Lines 13-15 Claim 1, Lines 12-14. Please change "the inverter module; and the inverter module," to -- an inverter module; and --.

Column 20, Line 29 Claim 1, Line 28. Please change "if the parameter" to -- if a parameter --.

Signed and Sealed this
Twenty-second Day of July, 2025

Coke Morgan Stewart
*Acting Director of the United States Patent and Trademark Office*